United States Patent [19]

Suhami et al.

[11] Patent Number: 5,164,984
[45] Date of Patent: Nov. 17, 1992

[54] HANDS-FREE TELEPHONE ASSEMBLY

[75] Inventors: Avraham Suhami, Paris, France; Shmuel Suhami, Tel-Aviv, Israel

[73] Assignee: Technology Management and Ventures, Ltd., Middlesex, United Kingdom

[21] Appl. No.: 461,311

[22] Filed: Jan. 5, 1990

[51] Int. Cl.⁵ .............................. H04M 1/05
[52] U.S. Cl. ................... 379/444; 379/430; 379/447; 381/68.6; 381/151
[58] Field of Search ............... 379/420, 421, 443, 444, 379/447, 431, 430, 161; 381/157, 68.6

[56] References Cited

U.S. PATENT DOCUMENTS

| | | | |
|---|---|---|---|
| 4,025,734 | 5/1977 | Aloupis | 381/151 |
| 4,588,867 | 5/1986 | Konomi | 379/430 |

FOREIGN PATENT DOCUMENTS

| | | | |
|---|---|---|---|
| 0088996 | 5/1983 | Japan | 381/151 |
| 0066293 | 4/1984 | Japan | 379/430 |
| 0066294 | 4/1984 | Japan | 379/430 |
| 2198612 | 6/1988 | United Kingdom | 379/420 |

Primary Examiner—James L. Dwyer
Assistant Examiner—Jhancy Augustus
Attorney, Agent, or Firm—Sandler, Greenblum & Bernstein

[57] ABSTRACT

A hands-free telephone assembly according to the present invention comprises a speech network mounted in a base and having an input channel and an output channel, the speech network being connected to a telephone interface which is selectively connectable to a telephone line. Also included are a gain-controllable amplifier in said input channel, a primary transducer including a primary speaker connected to the output of said gain-controllable amplifier, and a primary microphone, and a gain and frequency controllable amplifier connecting the primary microphone to said input channel. The primary transducer is mounted in a housing separate from the base, said housing being constructed and arranged so as to fit within the ear canal of a user and to be releasably maintained therein. Finally, the assembly contains a cancellation mechanism for suppressing positive feedback between the primary microphone and the primary speaker.

8 Claims, 2 Drawing Sheets

HANDS-FREE TELEPHONE ASSEMBLY

DESCRIPTION

1. Technical Field

This invention relates to a hands-free telephone assembly, and more particularly, to such an assembly in which the conventional handset is eliminated.

2. Background of the Invention

A conventional telephone handset includes a loudspeaker (also called a receiver) and a microphone. The receiver and the microphone are mounted on an assembly designed to permit the receiver to be held to the ear of a user while the microphone is positioned in front of the mouth of the user. The typical assembly includes a rigid handset in which the speaker and the microphone are separated by a distance of about 6 to 8 inches, the assembly being designed to enable a user to place the receiver to his ear while keeping the microphone positioned in front of his mouth.

The desirability of hands-free telephone use is well known, and elaborate assemblies have been devised for this purpose. One expedient is to replace the handset with a headset in the form of an elastic, semicircular assembly that can be attached to the head of a user, and which includes a speaker/receiver held adjacent the user's ear and a microphone mounted on a short support arm and maintained at a fixed distance from the mouth of the user.

Another expedient, is a shoulder support attachable to the conventional handset. The shoulder support is held in position on the shoulder of a user by the inclination of the user's head towards the support. In such position, the user's ear is located next to the receiver, while the user's mouth is adjacent the microphone of the headset.

While these expedients have been helpful, they are not comfortable for many individuals, and are thus not satisfactory. It is therefore an object of the present invention to provide a new and improved hands-free telephone assembly which is more compact and easier to use than assemblies of the prior art described above.

BRIEF DESCRIPTION OF THE INVENTION

A hands-free telephone assembly according to the present invention comprises a speech network mounted in a base and having an input channel and an output channel, the speech network being connected to a telephone interface which is selectively connectable to a telephone line. Also included are a gain-controllable amplifier in said input channel, a primary transducer including a primary speaker connected to the output of said gain-controllable amplifier, and a primary microphone, and a gain and frequency controllable amplifier connecting the primary microphone to said input channel. The primary transducer is mounted in a housing separate from the base, said housing being constructed and arranged so as to fit within the ear canal of a user and to be releasably maintained therein. Finally, the assembly contains a cancellation mechanism for suppressing positive feedback between the primary microphone and the primary speaker.

The invention is based on a recognition that the voice is propagated through the ear canal in addition to the mouth and throat. Thus, speech can be picked up by a microphone located in in the ear canal. The exact position of the microphone in the ear canal determines the frequency spectrum of the voice reaching the microphone after several reflections. Some positions of the microphone may seriously distort the sound and hamper the intelligibility of pronounced words.

The microphone in said housing is unidirectional and is positioned to point inwardly in the direction of the ear canal when said housing is fitted thereinto. Preferably, the microphone is mounted on a sound-absorbing cantilever support on the speaker. Also preferably, the housing includes a resilient, flexible, hollow, conical conduit whose narrower end is of a size to be received in the ear canal, the conduit having a plurality of circular holes whose diameter is a function of the location along the length of the conduit. The diameter of the holes near the narrower end of the conduit is larger than the diameter of the holes remote from the narrower end of the conduit.

In general, the distortion of a sound wave reaching the microphone after one or several reflections is by way of diminution its high frequency content. This distortion is compensated for by the various diameter holes in the conduit which act as "leaks" with a "preference" for certain frequencies determined by the diameter of a hole. The attenuation of the high frequency components may also be partially remedied by using a microphone with lesser low frequency response and by amplifying the electrical signal of the microphone selectively for higher frequencies.

The means for suppressing positive feedback may be in the form of a secondary transducer mounted in the same or in a second housing of a size comparable to to the first housing. When a second housing is provided, the telephone set includes a conduit or chamber having a geometry comparable to a human ear, the second housing being embedded in said chamber. The chamber or conduit is shaped so as to preserve the original frequency spectrum emanating from the ear canal. The secondary transducer includes a secondary speaker driven by the gain controlled amplifier, and a secondary microphone provided with its own separate gain and frequency controlled amplifier.

In one aspect of the invention, each transducer is mounted in different housings, the outputs of the gain and frequency controllable amplifiers connected to the microphones are applied to the inputs of a differential amplifier whose output is connected to the input channel of the speech network. The signals applied to the differential amplifier will essentially cancel in the absence of voice or information input.

In another aspect of the invention, when both transducers are mounted in the same housing, the secondary speaker is merged into the primary speaker, and the primary microphone is positioned in front of the primary speaker, and the secondary microphone is positioned behind the speaker. In this manner, the input to the two microphones will be out of phase and will cancel in the absence of voice or information input.

BRIEF DESCRIPTION OF THE DRAWINGS

Embodiments of the present invention are shown by way of example in the accompanying drawings wherein.

DETAILED DESCRIPTION

Figure 1:
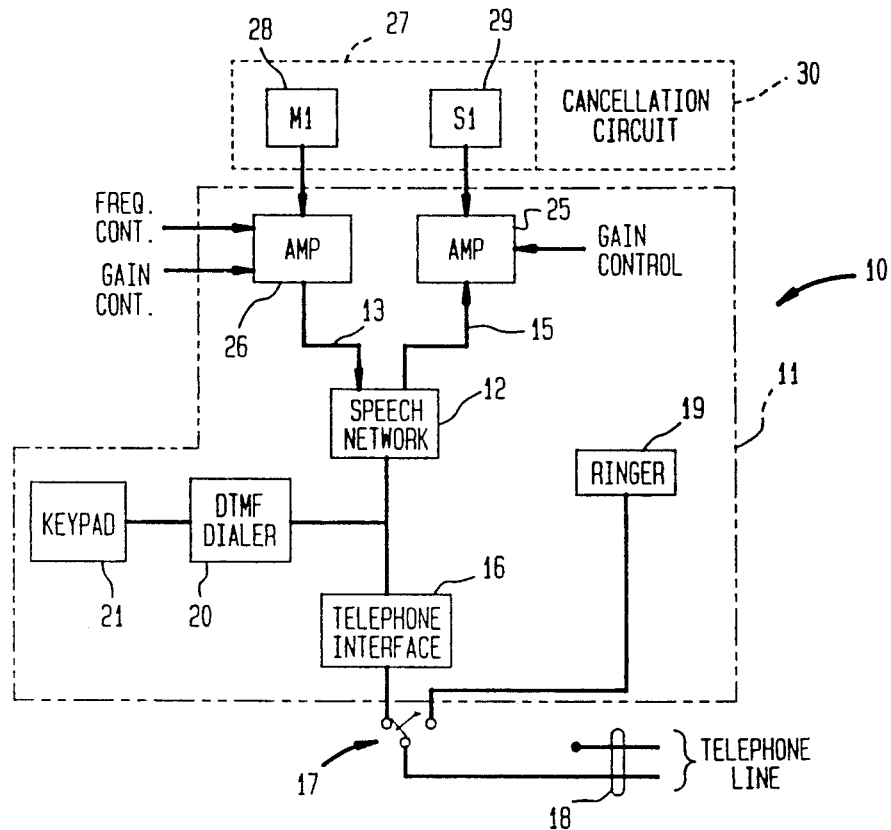
FIG. 1 is a block diagram showing one embodiment of the present invention.

Referring now to the drawings, reference numeral 10 designates a hands-free telephone assembly according to the present invention. Assembly 10 includes base 11 containing the usual components of a conventional telephone set including speech network 12 having input channel 13 and output channel 15, the speech network being connected to telephone interface 16. Two position switch 17, under control of a user, is effective to alternatively connect telephone line 18 to interface 16 or to ringer 19. Switch 17 thus serves the function of the off-hook switch of a conventional telephone set. Finally, base 11 also includes the usual dial mechanism in the form a DTMF circuit 20 which is effective, under control of keypad 21 to dial a user selected number into the telephone line when switch 17 connects the outside telephone line to interface 16.

Associated with base 11 is gain-controllable amplifier 25 in output channel 15 of speech network 12, and gain- and frequency controllable amplifier 26 in input channel 13 of the speech network. Housing 27 contains a primary transducer in the form of primary microphone 28 connected to the input to amplifier 26, and primary speaker 29 connected to the output of amplifier 25. According to the present invention, housing 27 is constructed and arranged so as to fit within the ear canal of a user and to be releasable maintained therein in the manner described below.

Finally, the invention also includes cancellation circuit 30 for suppressing positive feedback between the primary microphone and speaker. Such means are necessary to ensure that the receiver output picked up by the microphone does not generate a regenerative positive feedback causing the circuit to oscillate. Details of several cancellation mechanisms according to the present invention are discussed below.

Figure 2:
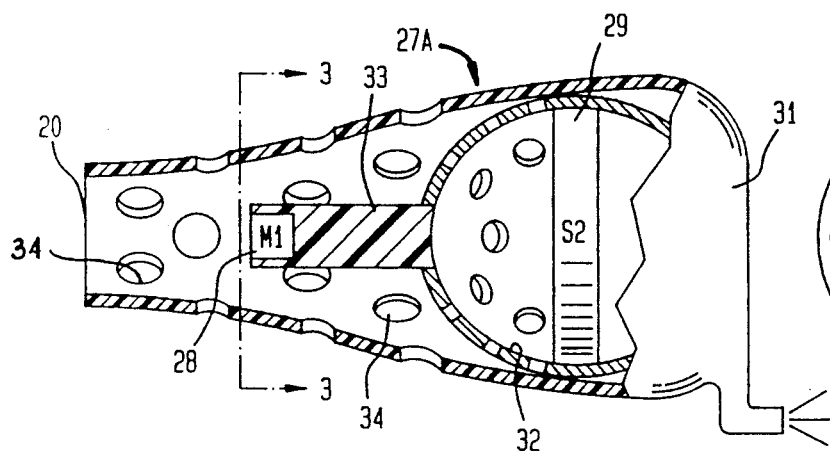
FIG. 2 is a sectional schematic view of a microphone/speaker packaged in a housing according to the present invention.
Figure 3:
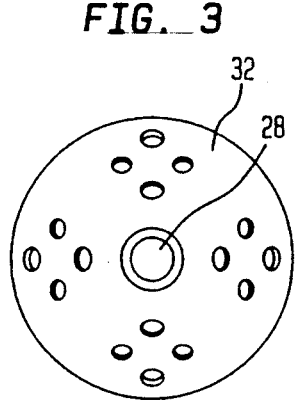
FIG. 3 is a section taken along the line 3-3 of FIG. 2.

Referring now to FIG. 2, a housing designed to permit insertion into the ear canal of a user is designated by reference numeral 27A. Housing 27A is an elongated, flexible, and generally conical hollow sleeve whose smaller end 30 and whose larger end is closed as indicated; at 31. Contained within housing 27A at end 31 is speaker 29 which snugly fits inside the closed end of the sleeve. Forwardly of the speaker is dome-shaped enclosure 32 of sheet material which is provided with a plurality of apertures. In the central portion of the dome is mounted, in cantilever fashion, sound-absorbing rod 33 which projects toward open end 30 of the sleeve; and unidirectional microphone 28 is mounted on the free end of rod 33.

As shown in FIG. 2, the sleeve has a plurality of circular holes 34 whose diameter is a function of the position of the holes along the length of the sleeve. The diameter of holes 34 near the narrower end of the sleeve is smaller than the diameter of the holes remote from the narrower end of the sleeve. Selection of the size of the holes provides the designer with a parameter that enhances transmission of selected bands of frequencies.

The present invention contemplates a cancellation mechanism that is effective to feed the primary microphone amplifier with an inverted signal derived from a secondary microphone of a second receiver/microphone assembly situated at a distance from the primary receiver/microphone assembly which is located in the ear canal of the user. The second assembly is inserted in a mold resembling the ear geometry for faithfully simulating the reflections from the walls of the ear canal. Both speakers in each of the primary and secondary assemblies are fed by the same input signal. Such an arrangement generates at the output of the microphone situated in the second receiver/microphone assembly a signal similar in frequency and time to the undesired feedback picked up by the microphone in the ear canal. Subtracting it from the output of the first microphone effectively cancels the unwanted feedback and leaves only the signal emanating from the ear canal.

Figure 5:
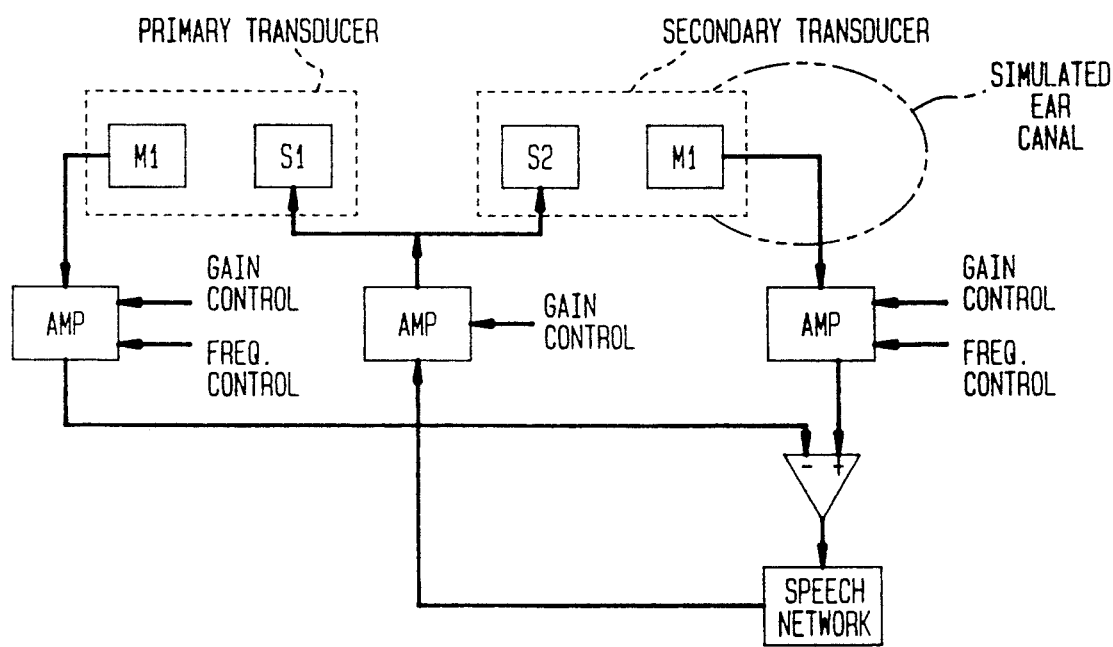
FIG. 5 is a block diagram of a further embodiment of the invention for suppressing feedback.

A circuit for achieving the results described above is shown in FIG. 5. As shown, a single gain controllable amplifier drives the speakers in each of the primary and secondary transducers. Each of the microphones in the two transducers is applied to the speech network of the telephone through gain and frequency controllable amplifiers whose outputs are connected to the respective inputs of a differential amplifier. The output of the differential amplifier will be the desired signal without a significant amount of feedback.

Alternatively, the cancellation mechanism may include a secondary microphone positioned behind the primary speaker at a symmetrical position relative to the primary microphone and at such a distance that the magnitude of the sound emanating from the speaker and picked up by the primary microphone will be equal to that picked up by the secondary microphone. The position of the secondary microphone is selected in such a way that sound waves and the corresponding electrical signals are in phase opposition to that of the primary microphone. In such case, adding the outputs of both microphones causes the desired cancellation of spurious speaker-to-microphone feedback. If, however, the positions of the microphones is such that the sounds they pick up are in phase, the desired cancellation may be achieved by inverting the output signal from one of the microphones before combining the outputs.

The speaker-and-two-microphone assembly may also be tuned so as to eliminate noise and other sounds that reach both microphones. After the speaker-and-two-microphones assembly is plugged into the ear, the ratio of sound picked up by the two microphones respectively may be adjusted to be the same, irrespective of the origin of the sound, whether it emanates from the surroundings or from the speaker that is in-between. This adjustment may be done by changing the distance of the secondary microphone from the back of the speaker, because this procedure changes the magnitude of the sound picked by it and coming from the speaker without appreciably changing the amount of sound detected and coming from the surroundings. Thus, changing the distance of the second microphone from the speaker is a practical way to equate these ratios. By then amplifying, by an appropriate amount, the signal of the secondary microphone and subtracting it from the output of the first microphone, effectively cancels both the feedback from the speaker and the surrounding ambient sounds and leaves unaffected the voice sound emanating from the ear canal.

Figure 4:
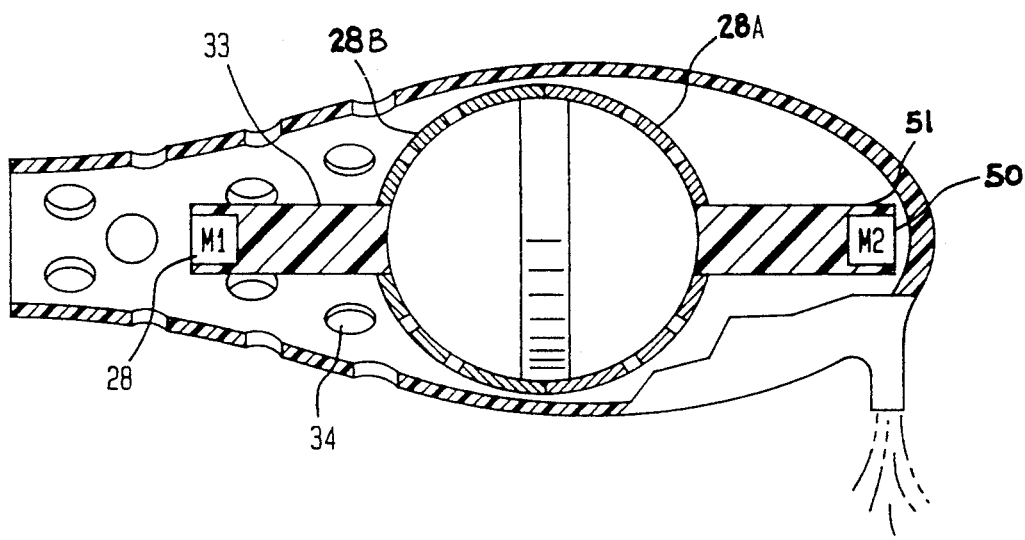
FIG. 4 is a sectional schematic of another embodiment of the present invention for suppressing feedback between the microphone and speaker when each is in the same housing.

The arrangement of a speaker-and-two-microphone assembly is shown in FIG. 4. In this arrangement, the speaker is provided with front and rear domes 28B, 28A, and primary microphone 28 is mounted in the same way as shown in FIG. 2. Secondary microphone 50 is mounted in sound-absorbing rod 51 that extends from the central portion of dome 28A in a rearward direction, i.e., in a direction way from the ear canal.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A hands-free telephone assembly comprising:
   a) a speech network mounted in a base unit and having an input channel and an output channel, said speech network being connected to a telephone interface which is selectively connectable to a telephone line;
   b) a gain-controllable amplifier in said output channel;
   c) a primary transducer including a speaker connected to the output of said gain-controllable amplifier, and a primary microphone;
   d) a gain and frequency controllable amplifier connecting the primary microphone to said input channel;
   e) a housing separate from the base unit and containing said primary transducer;
   f) said housing being constructed and arranged so as to fit the ear canal of a user and to be releasably maintained therein; and
   h) a cancellation mechanism for suppressing positive feedback between said primary microphone and speaker;
   i) wherein the microphone in said housing is unidirectional and is positioned toward the ear canal when said housing is fitted thereinto; and
   j) wherein the microphone in said housing is mounted on a cantilever support on the speaker in said housing, said support being of sound absorbing material.

2. A hands-free telephone assembly according to claim 1 wherein said housing includes a resilient, flexible, hollow, generally conical conduit whose narrower end is of a size to be received in the ear canal, said conduit having a plurality of circular holes whose diameter is a function of the location along the length of the conduit.

3. A hands-free telephone assembly according to claim 2 wherein the diameter of the holes near the narrower end of the conduit is smaller than the diameter of the holes remote from the narrower end of the conduit.

4. A hands-free telephone assembly comprising:
   a) a speech network mounted in a base unit and having an input channel and an output channel, said speech network being connected to a telephone interface which is selectively connectable to a telephone line;
   b) a gain-controllable amplifier in said output channel;
   c) a primary transducer including a speaker connected to the output of said gain-controllable amplifier, and a primary microphone;
   d) a gain and frequency controllable amplifier connecting the primary microphone to said input channel;
   e) a housing separate from the base unit and containing said primary transducer;
   f) said housing being constructed and arranged so as to fit the ear canal of a user and to be releasably maintained therein; and
   h) a cancellation mechanism for suppressing positive feedback between said primary microphone and speaker;
   i) wherein the microphone in said housing is unidirectional and is positioned toward the ear canal when said housing is fitted thereinto; and
   j) wherein the cancellation mechanism includes a second transducer in the from of a secondary microphone and a secondary speaker mounted in a second housing of a size comparable to the first mentioned housing, and a second gain and frequency controllable amplifier, and wherein said telephone includes a chamber having a geometry comparable to a human ear, said second housing being embedded in said chamber.

5. A hands-free telephone assembly according to claim 4 including:
   a) a differential amplifier having a pair of inputs respectively connected to the output of the two gain and frequency controllable amplifiers; and
   b) means connected to the output of said differential amplifier to said input channel of the speech network.

6. A hands-free telephone assembly according to claim 2 comprising:
   a) a speech network mounted in a base unit and having an input channel and an output channel, said speech network being connected to a telephone interface which is selectively connectable to a telephone line;
   b) a gain-controllable amplifier in said output channel;
   c) a primary transducer including a speaker connected to the output of said gain-controllable amplifier, and a primary microphone;
   d) a gain and frequency controllable amplifier connecting the primary microphone to said input channel;
   e) a housing separate from the base unit and containing said primary transducer;
   f) said housing being constructed and arranged so as to fit the ear canal of a user and to be releasably maintained therein; and
   h) a cancellation mechanism for suppressing positive feedback between said primary microphone and speaker;
   i) wherein the microphone in said housing is unidirectional and is positioned toward the ear canal when said housing is fitted thereinto; and
   j) wherein said cancellation mechanism includes a secondary microphone mounted in said housing such that the secondary microphone is positioned behind the primary speaker.

7. A hands-free telephone assembly according to claim 6 wherein each microphone is physically attached to the housing of the speaker by a sound absorbing column.

8. A method for using a hands-free telephone assembly of the type having a speech network mounted in a base unit and having an input channel and an output channel, said speech network being connected to a telephone interface which is selectively connectable to a telephone line; a gain-controllable amplifier in said output channel; a primary transducer including a speaker connected to the output of said gain-controllable amplifier, and a primary microphone; a gain and frequency controllable amplifier connecting the primary microphone to said input channel; a housing separate from the base unit and containing said primary transducer; said housing being constructed and arranged so as to fit the ear canal of a user and to be releasably maintained therein; said method comprising providing a chamber having a geometry comparable to a human ear, inserting into said chamber a second housing containing a second transducer in the form of a secondary microphone and a secondary speaker, said second housing being of a size comparable to the first mentioned housing, and connecting the secondary microphone to the speech network through a second gain and frequency controllable amplifier for suppressing positive feedback between said primary microphone and speaker.

* * * * *